PERCENTAGE TIME DIVISION MULTIPLEX FOR PULSE CODE MODULATION

Filed Sept. 1, 1948 3 Sheets-Sheet 1

INVENTOR
L. A. MEACHAM
BY George C. Lord
ATTORNEY

INVENTOR
L. A. MEACHAM
BY George C. Ford
ATTORNEY

July 15, 1952 L. A. MEACHAM 2,603,714

PERCENTAGE TIME DIVISION MULTIPLEX FOR PULSE CODE MODULATION

Filed Sept. 1, 1948 3 Sheets-Sheet 3

INVENTOR
L. A. MEACHAM
BY George C. Lord
ATTORNEY

Patented July 15, 1952 2,603,714

UNITED STATES PATENT OFFICE 2,603,714

PERCENTAGE TIME DIVISION MULTIPLEX FOR PULSE CODE MODULATION

Larned A. Meacham, New Providence, N. J., assignor to Bell Telephone Laboratories, Incorporated, New York, N. Y., a corporation of New York Application September 1, 1948, Serial No. 47,254

8 Claims. (Cl. 179—15)

This invention relates to time division multiplex communications systems employing pulse code modulation.

In communications systems utilizing what is known as pulse code modulation, a speech wave or other signal to be transmitted is sampled periodically to ascertain its instantaneous amplitude. The measured instantaneous amplitude is expressed by pulse codes analogous to telegraph codes.

One code which conveniently may be employed in pulse code modulation involves permutations of a fixed number of code elements each of which may have any one of several conditions or values. An advantageous code of this type is the so-called binary code in which each of the fixed number of code elements may have either of two values. One advantageous way of representing these values is to represent one by a pulse sometimes referred to as an "on pulse" and the other by the absence of a pulse sometimes referred to as an "off pulse." Alternatively, one value may be represented by a positive pulse and the other by a negative pulse. The total number of permutations obtainable with the binary code is proportional to $2p$ where $p$ is the number of code elements employed.

Because the total number of different amplitudes which may be represented by such a code of a fixed number of elements is limited, it is necessary to divide the continuous range of amplitude values of which the transmitted signal is capable into a fixed number of constituent ranges which together encompass the total range. Each of these smaller or constituent amplitude ranges may then be treated as if it were a single amplitude instead of a range and is represented by an individual one of the permutations of the code. In the use of this method of code transmission, the instantaneous amplitude ascertained by a sampling operation is represented by the respective permutation indicative of the amplitude or step which most nearly approximates the amplitude of the measured sample. If, for example, the sample amplitude is nearest to that amplitude represented by the ninth step of the signal amplitude range the permutation code corresponding to range 9 is transmitted.

The binary code may be conveniently so organized that each code element in one of its values represents the presence in the sampled amplitude of a particular fixed portion of the total amplitude range, while in the other value it represents the absence of that same portion.

The several code element signals or pulses may be transmitted by either frequency or time division multiplex; that is, the $p$ elements of a code group may be transmitted consecutively over a single line or frequency channel or they may be tarnsmitted simultaneously over $p$ different frequency channels.

When the code element signals comprising the code groups are transmitted by time division multiplex it is possible by an extension of the time division principle to transmit groups of signals representative of several different messages over the same line or frequency channel. For this purpose it is usual to transmit code groups of pulses, each group representing a sample of one of the several messages, in succession until each message has been represented once and then to repeat the cycle. This process is subject to the inherent requirement for time division transmission that each message signal be sampled at a rate which is at least twice as high as the highest frequency component of the message which it is desired to transmit. This sets an upper limit as to the length of the interval in which one increment of information is transmitted for each of the several messages. Thus if it is desired to transmit messages having frequency components up to 4000 cycles per second it is necessary to sample each message at least 8000 times per second, and as a result the interval referred to above, which is sometimes known as the frame length (L) becomes $1/8000=125$ microseconds.

The limitation as to frame length indicated above does not present any great problem in the time division transmission of a relatively small number of messages by pulse code modulation because it is necessary only to shorten the code element pulses and to increase the operating speed of the coding and decoding instrumentalities to a sufficient extent to allow accommodation of the necessary array of pulses within the frame. However, when it is desired to construct a multichannel system, having a capacity for a large number of message signals, one hundred messages for example, the portion of the frame mentioned which may be allotted to the code group representing any one message becomes very short. Consequently, the coding and decoding devices are required to operate at rates which are not easily obtained.

One solution which has been proposed to the problem of providing multichannel time division systems involves the utilization of a large number of coding devices, sometimes as many as one for each message signal, which are capable of operation at only moderate rates and the provision of means for storing the code element pulses produced at such moderate rates by each coder in such a way that they may subsequently be sampled by some form of high speed distributor and transmitted cyclically over a single communication channel.

It is an object of the present invention to provide a multichannel communication system capable of the transmission of a large number of messages on a time division basis in which the coding devices employed need be capable only of moderately high speeds.

It is another object of the invention to provide multichannel communication systems for the transmission of a large number of messages by pulse code modulation, wherein the necessity for the storage and subsequent sampling of encoded signals is eliminated.

In accordance with the above objects, the communication system of the invention comprises means for sampling the amplitudes of a large number of message signals recurrently and in turn. A plurality of coding devices, fewer in number than the number of channels, is provided and the samples of the message signals are distributed equally among the coding devices. A control circuit is provided which staggers the code element pulses produced by the several coding devices in such a way that adjacent code element pulses from any one of the coding devices are separated in time by code element pulses from other coding devices.

Thus, for example, in a system of the type contemplated by the invention, ten coding devices might be employed to accommodate one hundred message channels. In this instance, each code element interval for any one of the ten coding devices could be separated from the next code element interval of the same device by an interval which is ten times greater than that which could be provided if message signal samples were applied consecutively to a single coder.

The above and other features of the invention will be described in detail in the following specification taken with the drawings in which, Fig. 1 is a timing diagram indicating the distribution of messages among the several coders of a typical communication system in accordance with the invention;

Figures 1, 2:
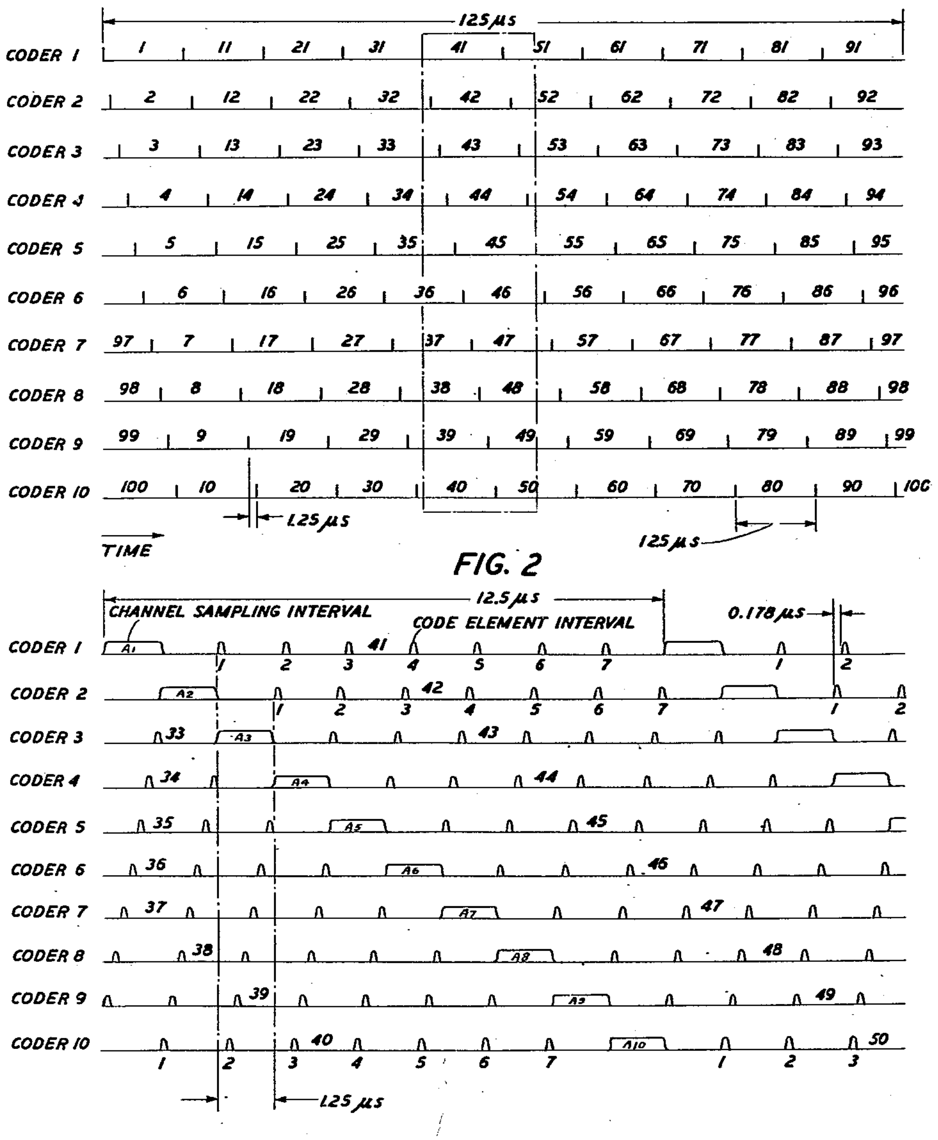
Fig. 2 is a timing diagram on an increased scale indicating the relationship of the code element pulses to the allotted channel intervals for that small portion of the diagram of Fig. 1 enclosed by the dot-dash lines therein.

For purposes of illustration, the timing arrangements and circuit details will be considered for a time division, pulse code modulation system employing a seven unit binary code and capable of transmitting one hundred messages having frequency components up to 4000 cycles per second. Conveniently, and as indicated in Figs. 1 and 2, ten coders or pulse coder modulators are provided to handle the one hundred message channels. The distribution of messages among the ten coders is shown in Fig. 1 and it will be noted that the messages are assigned consecutively to the ten coders in such fashion that the 1st, 11th, 21st, etc. message channels are assigned to coder 1; all channels having number designations ending in "2" are assigned to coder 2, those having number designations ending in "3" are assigned to coder 3, and so forth. It will be further noted that the time assignment for the message channels assigned to consecutively numbered coders is such that the channel intervals or periods are staggered in time by a small amount. The significance of this fact will be more apparent from a consideration of the detailed timing diagram of Fig. 2.

In Fig. 2 the complete arrangement of possible code element pulses for a few of the one hundred message channels indicated in Fig. 1 is shown. It will be recognized that the actual code groups to be transmitted will not necessarily include all of pulses since this will depend upon the amplitude of the message signals when sampled. Accordingly the pulses of Fig. 2 may be considered as defining the times at which pulses may be transmitted to represent the seven elements of each code group. As indicated by the dot-dash lines of Fig. 1, at least portions of the channel intervals or periods for messages 32 through 54 are illustrated in Fig. 2. In Fig. 2 a channel sampling interval and seven code element intervals are shown in the period assigned to each of the message channels. The sampling interval represents the time in which a sample of the amplitude of the message signal is obtained and stored for application to the coding device. The seven code element intervals, which are evenly distributed throughout the remainder of the channel period, indicate the times at which the coding device, operating upon the sample obtained during the sampling interval, may produce code element pulses.

In accordance with the invention, the sampling pulses which initiate the coding operation, for each message channel, are displaced in time in such a way as to permit interleaving of code element pulses produced by the several coders in a common output circuit. Thus, after a message sample has been applied to and has initiated operation of any one coder, a message sample is applied to each of the remaining coders in turn before a second message sample is applied to the first-mentioned coder.

Taking the conditions assumed above, which call for a 100-channel system employing ten coders for generating 7-unit code, and setting an upper limit to the frequencies to be transmitted at 4000 cycles per second, the frame time, within which one 7-unit code group must be transmitted for each of the 100 message channels, is 125 microseconds and each code element interval is $$\frac{125}{7\times 100}$$

or approximately 0.178 microsecond. Since each coder handles 10 messages in the frame time, 12.5 microseconds may be allotted to each message channel and in this interval the message must be sampled and a code group of pulses produced. Sampling pulses must be applied to all ten coders in this 12.5 microsecond interval and conveniently and as shown in Fig. 2, each sampling pulse is given a duration of 1.25 microseconds. The sampling pulses for the ten coders thus occupy the entire 12.5 microsecond interval assigned to any particular message, the sampling pulse for the second coder being applied simultaneously with the ending of the sampling pulse for the first coder, etc.

It will be recalled that in any message channel interval, the period remaining after the sampling pulse, is occupied by seven evenly distributed code element intervals. During this same message channel interval one sampling pulse is applied to each of the ten coders. The time between corresponding portions of adjacent code element intervals for any one coder is thus somewhat greater than the length of the sampling pulses. Accordingly and as indicated in Fig. 2, the first code element interval for channel 42 leads the second code element interval for channel 41, while the first code element pulse for channel 43 leads the second code element pulse for channel 42 by the same amount, and so forth. The code element pulses may be of rounded form, and are preferably made 0.178 microsecond in length between the points at which their amplitude is one half of maximum, thus fully occupying their allotted 0.178 microsecond intervals. Accordingly, when the output signals from the ten coders are multipled together on a single output lead, successive code element pulses produced by the coder assigned to any particular channel are separated by seven pulses from other coders. The channel sampling pulses are not transmitted and it will be understood that in the combined signal the intervals allotted to the sampling operation of each coder are occupied by code pulses from other coders.

From a consideration of the above, it will be apparent that each of the ten coders is allowed one-tenth of the entire 100-channel frame interval in which to produce a pulse code group representative of an applied message signal sample. The requirements upon the coding device are thus no more stringent than those encountered in a ten channel system. Further, it will be noted that because of the particular timing arrangement of the invention, each output pulse from each coder is accepted for transmission over the single time division channel at the moment in which it is generated, thus eliminating any necessity for storing and distributing arrangements.

Figure 3:
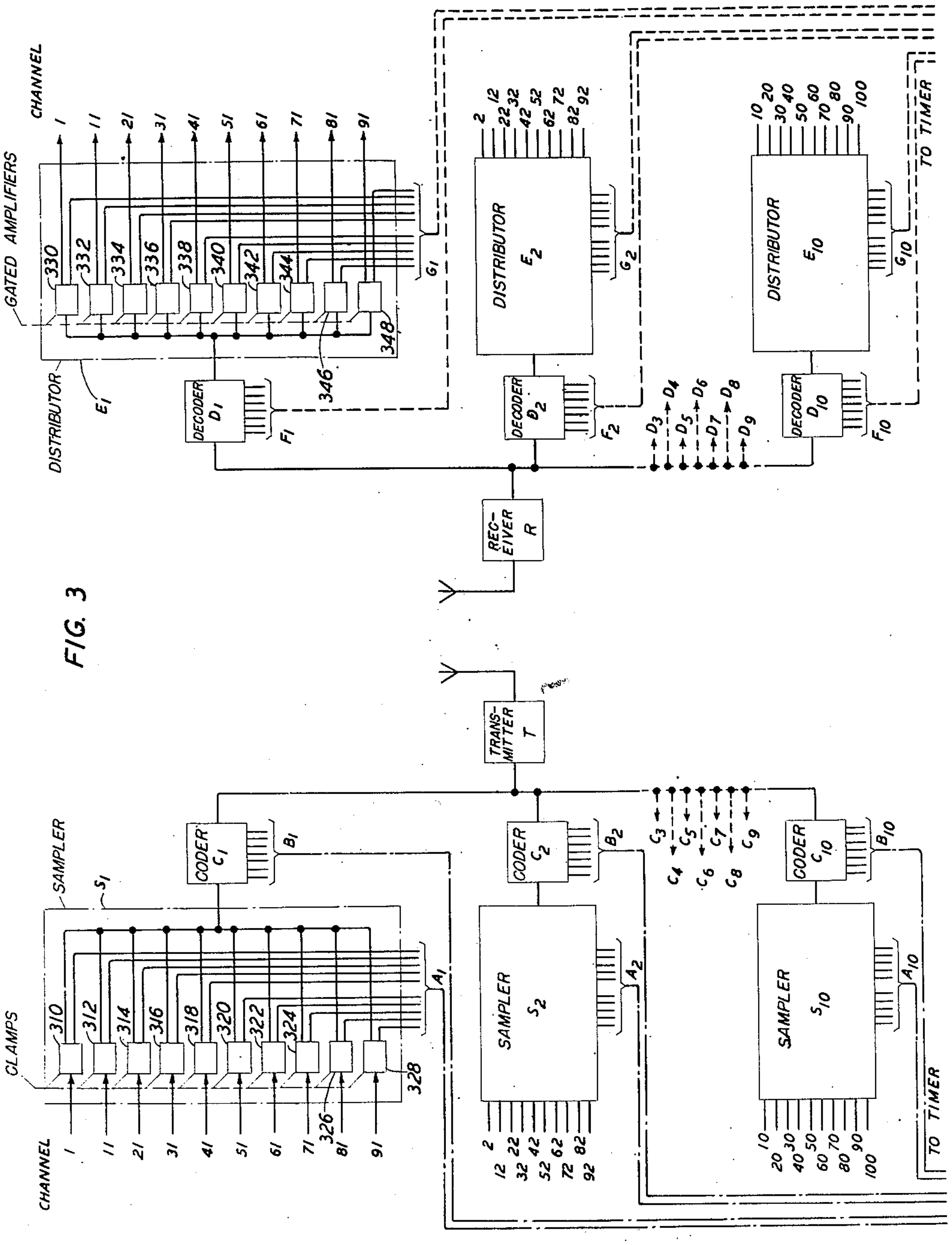
Fig. 3 is a block schematic diagram indicating the circuit arrangement of the elements of a communicating system in accordance with the invention.

The general layout of a circuit capable of operating in accordance with the diagrams of Figs. 1 and 2, is shown in block schematic form in Fig. 3. Here certain of the input message channels are indicated and the equipment necessary for the accommodation of these messages is illustrated. The equipment required for the remaining message input connections is identical to that shown. Referring to the left-hand portion of Fig. 3, three of the ten coders are indicated at $C_1$, $C_2$, $C_{10}$. The points at which the remaining coders would be connected being indicated at $C_3$ through $C_9$. A sampling circuit is associated with each of the coders, these circuits being shown at $S_1$, $S_2$, and $S_{10}$ respectively.

Each of the sampling circuits is arranged to accept ten message waves and to provide an output for application to the associated coder which output comprises successive samples of the instantaneous amplitudes of the messages present in the ten input circuits taken in turn. Each sampling circuit may for example, include ten devices of the type sometimes referred to as a two-way clamp. Such a device comprises an electronic switch capable when closed of the transmission of current in either direction between an input and an output circuit and so arranged that when open no current can pass between the input and the output. Sampling circuits of this type are described in detail in the Bell System Technical Journal for January 1948 at pages 26 and 27. Ordinarily one such clamp is associated with each of the input channels as shown at 310 through 328 for sampler $S_1$. The output circuit of each of the clamps may comprise a storage capacitor which is charged to the message wave amplitude when a particular electronic switch is closed, and which is prevented from discharging during the subsequent interval in which the switch is open. Alternatively, the ten electronic switches of a single sampling unit may control a single storage capacitor which may form a part of the coding circuit. Timing pulses derived from a source later to be described and indicated at $A_1$, $A_2$, and $A_{10}$, are applied to the corresponding sampling units in such fashion that messages in the several input channels are sampled in the order indicated in Figs. 1 and 2 of the drawings.

Conveniently the coding units may be of the type in which the sampled amplitude is compared at successive intervals with some electrical quantity which is built up step-by-step and a code pulse of one type is produced if the result of this comparison indicates that the sample is larger than the electrical quantity built up and a code pulse of the other type produced if the comparison indicates the opposite result. One coder of this type is disclosed in the patent to J. R. Pierce 2,451,044, October 12, 1948. Such coders require the application of a control pulse for each comparison operation so that seven control pulses are required for the production of a seven unit code. Such pulses are shown in Fig. 3 as being applied at $B_1$, $B_2$, $B_{10}$, respectively, from a source later to be described.

The output code groups from the several coding units timed as indicated in Figs. 1 and 2 are multipled and applied to a transmitter T from which they are radiated.

The signals radiated from transmitter T, are picked up by receiver R and applied in parallel to ten decoders $D_1$ through $D_{10}$, corresponding to the ten coders employed at the transmitter. Conveniently decoders $D_1$ through $D_{10}$ may be of the type in which an electrical quantity as for example the charge in a capacitor corresponding to the sample amplitude which produced the code group at the transmitter is varied in response to the code element pulses of the received code group. One decoder of this general class is disclosed in detail in the patent to M. M. Goodall 2,449,467, September 14, 1948. This type of decoder requires the application of a control pulse synchronized with each of the received code element pulses. The seven pulses required by the code employed herein by way of illustration are supplied from timing equipment to be described below over leads $F_1$ through $F_{10}$ respectively. It will be understood that the timing circuits at the receiving station are synchronized with those at the transmitting station, so that decoder $D_1$ is made effective to operate upon the code groups produced by coder $C_1$. Correspondingly, the code groups produced by coder $C_2$ are decoded by decoder $D_2$, etc.

The output of each of the decoders will comprise a series of pulses corresponding to the amplitudes of the message wave samples for the ten channels assigned to that decoder. These pulses will occur consecutively and means must be provided for distributing them to the output channels to which they correspond. Such means, designated $E_1$ through $E_{10}$, may comprise one of the known types of time division distributors. As shown within the block $E_1$ each distributor may comprise ten gated amplifiers, 330 through 348, each of which is enabled in turn at the proper instant by timing pulses applied over leads $G_1$. Distributors of this type are disclosed in the patent to A. S. Riggs 2,048,081, July 21, 1936 and the patent to A. D. Blumlein 2,172,354, September 12, 1939. These timing pulses are synchronized to occur at the channel rate so that the appropriate sample amplitude pulse is applied to the output channel to which it corresponds.

Figure 4:
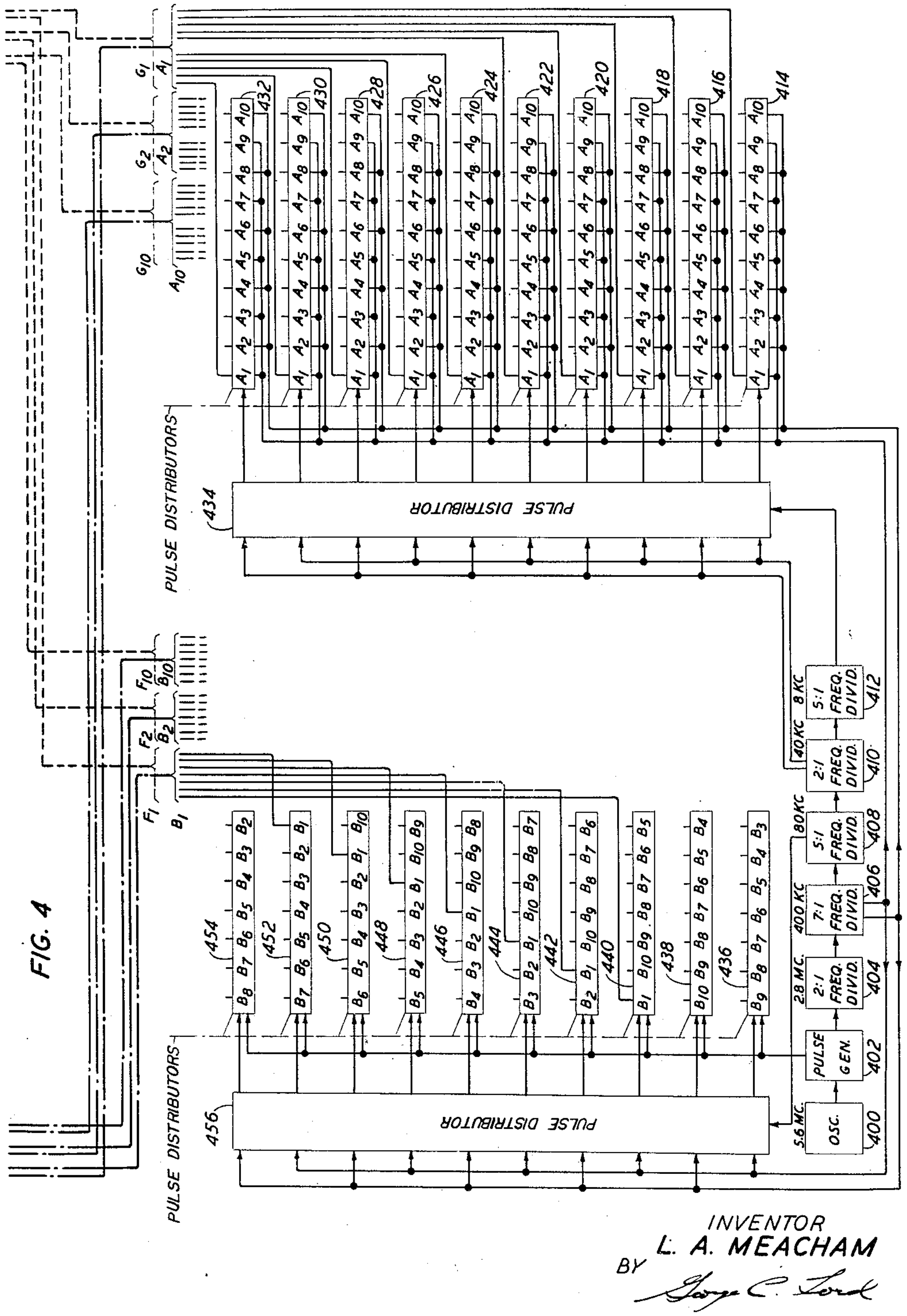
Fig. 4 is a block schematic diagram indicating the arrangement of one form of timing circuit suitable for the control of either the transmitting or receiving portions of the communication system shown in Fig. 3.

The various timing pulses required for the operation of the transmitting and receiving equipment described above may be provided by any of a number of known types of timing pulse generators or pulse distributors. By way of example, and as shown in Fig. 4, the timing circuit may comprise a number of gate pulse distributors of the type comprising a plurality of single trip multivibrators connected in tandem in such fashion that the operation of each is effective to trigger the next in line. A tandem arrangement of trigger circuits of this type is disclosed in the patent to J. M. Hollywood 2,306,386, December 29, 1942. One set of timing pulses may be employed to initiate operation of the chain of single trip multivibrators and a second group of pulses, occurring at a frequency which is that multiple of the initiating pulse frequency which is equal to the number of single trip multivibrators in the chain, is employed accurately to terminate the square top pulse produced by each single trip multivibrator. Such gate pulse distributors are also disclosed in my copending application Serial Number 646,455, filed February 8, 1946; now Patent No. 2,486,491, November 1, 1949.

The timing circuits of Fig. 4 are arranged specifically to supply the necessary pulses for the operation of a one hundred channel system wherein a seven unit code and a sampling rate of 8000 samples per second are employed. For this purpose, the output of a 5.6 megacycle oscillator 400 is applied to a pulse generator 402, which converts the sinusoidal output of the oscillator into a train of rectangular pulses of the same fundamental frequency. The pulse output of the pulse generator is applied to a chain of frequency dividing multivibrators 404, 406, 408, 410 and 412, which operate respectively at dividing ratios of 2:1, 7:1, 5:1, 2:1, and 5:1, to provide an output pulse series of fundamental frequencies of 2.8 megacycles, 400 kilocycles, 80 kilocycles, 40 kilocycles, and 8 kilocycles per second, respectively. The use of multivibrators for frequency division is disclosed in the patent to J. B. Gibbs et al. 2,304,813, December 15, 1942.

The sampling pulse group $A_1$ through $A_{10}$ are produced by the equipment shown in the right hand portion of Fig. 4. For this purpose ten pulse distributors 414 through 432 are provided. Each of these distributors is arranged to produce ten output pulses. The initiating pulses for these ten distributors are obtained from still another pulse distributor 434. The first pulses from distributors 414 through 432 follow one another at intervals determined by the timing of distributor 434 and are employed to provide the group of pulse $A_1$ to control the operation of sampling unit $S_1$. In similar fashion the second pulses from each of the ten distributors are employed to provide the pulse group $A_2$ and the same general arrangement is employed for each of the other groups of pulses.

It will be apparent from examination of the timing chart of Fig. 2 that the repetition rate for any particular sampling pulse is 8 kilocycles per second, that is, the first pulse from distributor 414, for example, must occur once every 125 micro-seconds. It follows that distributor 434 must produce a series of output pulses on each of its ten output connections occurring at a repetition rate of 8 kilocycles per second and these pulse series must be staggered by 12.5 micro-seconds. Operation of distributor 434 is therefore initiated by an 8 kilocycle per second pulse from frequency divider 412 and the terminating pulses for the ten pulse generators of this distributor are provided by alternate half-cycles of the output of the 40 kilocycle per second frequency divider 410, these alternate half-cycles being applied over separate leads as shown in Fig. 4 from the push-pull output of the frequency dividing multivibrator.

The control pulses for each of distributors 414 through 432 are obtained in the following manner: The start pulses for each of these distributors comprise the ten separate pulse outputs of pulse distributor 434 while the terminating control pulses for the ten sections of distributor 414 through 432 are obtained from the alternate half-cycles of the 400 kilocycle per second output from frequency divider 406. The output pulses $A_1$ through $A_{10}$ for any particular pulse generator thus occur at intervals of 1.25 micro-seconds.

The necessary pulses for the operation of the coding devices are obtained in much the same manner as the sampling pulses considered above and the portions of the circuit required for this purpose are shown at the left hand side of Fig. 4. It will be observed from Fig. 2 that seven actuating pulses occurring at intervals of $1.25+0.178$, or approximately 1.43 micro-seconds are required for each of the coding units $C_1$ through $C_{10}$. These pulses are obtained from certain of the output connections of a series of ten distributors, 436 through 454, each of which is arranged to produce 7 output pulses at intervals of 0.178 micro-second, and these distributors are timed in such fashion that the corresponding pulses from each distributor are separated by intervals of 1.25 micro-seconds. Thus, for example, the first pulse from distributor 440 precedes the second pulse from distributor 442 by an interval equal to $1.25+0.178=1.43$ micro-seconds.

The pulses necessary for initiating the operation of distributors 436 through 454 at intervals of 1.25 micro-seconds are obtained from a pulse distributor 456 of the same general type as those already discussed. Start pulses for this distributor occurring at a repetition rate of 80 kilocycles per second are obtained from frequency divider 408, while terminating pulses for the ten pulse generators are obtained from the alternate half-cycles of the 400 kilocycle per second output of frequency divider 406. The ten pulse outputs of distributor 456 thus occur at intervals of 1.25 micro-seconds and each has a repetition period of 12.5 micro-seconds. These pulses serve as the start pulses for the ten distributors 436 through 454 and the stop pulses therefore are obtained from the output of pulse generator 402 occurring at a repetition rate of 5.6 megacycles per second.

It will be recalled that the second pulse from distributor 442 follows the first pulse from distributor 440 by 1.43 micro-seconds, and that similar intervals exist between pulses of successively higher order from distributors of successively high orders. Accordingly the seven pulses of the group $B_1$ for coder $C_1$ are obtained by taking the first pulse from distributor 440, the second from 442, the third from 444, the fourth from 446, and so on through the seventh pulse, which is obtained from distributor 452. By virtue of similar connections, the pulses required for coder $C_2$ through $C_{10}$ may be obtained, the proper outputs from the distributor for each of the groups of pulses being indicated by $B_1$, $B_2$ . . . $B_{10}$, respectively.

The pulses required for the operation of the receiver may be obtained from a timing pulse generating circuit similar to that of Fig. 4. At the receiver, however, the circuit is driven by a 5.6 megacycle oscillator controlled as a slave by oscillator 400 at the transmitter through a suitable synchronizing system. Pulses $F_1$, $F_2$ through $F_{10}$ correspond to pulses $B_1$, $B_2$, through $B_{10}$, and may be obtained in the same manner. The groups of pulses designated by $G_1$, $G_2$, etc., are obtained from distributors 414 through 432, with the single exception that the output connections must be switched in such fashion that the sampling pulse occurs at the end rather than the beginning of the code group to which it corresponds. Thus, for example, the $A_1$ output leads of distributors 414, 416, etc., through 432, would have to be connected respectively to gated amplifiers 348, 330, 332, 334, 336, 338, 340, 342, 344 and 346. In all other respects, the timing equipment for the coder and decoder are identical.

What is claimed is:

1. In a communication system for transmitting a plurality of independent message waves, means for recurrently sampling the amplitudes of a plurality of message waves in predetermined order, a plurality of coding devices fewer in number than said message waves each arranged to produce permutation code groups of pulses representative of the amplitude of message wave samples applied thereto, means for applying said samples to said coders cyclically, and means for timing the operation of said coders to produce code groups of pulses displaced in phase relative to one another by amounts sufficient to permit interleaving of the individual code pulses.

2. In a communication system for transmitting a plurality of independent message waves, a sampling device for each of a plurality of message waves, timing means for enabling said sampling devices recurrently and in turn, $n$ coding devices where $n$ is smaller than the number of said sampling devices, each arranged to produce code groups of $p$ pulses representative of the amplitude of message wave samples applied thereto, connections between said sampling and coding devices for distributing said message wave samples equally among said coding devices and timing means controlling said coding devices to operate out of phase by amounts sufficient to permit the interleaving between adjacent code group pulses of each coder of single pulses from each of $p$ other coders.

3. In a communication system for transmitting a plurality of independent message waves, means for recurrently sampling the amplitudes of a plurality of message waves in turn, a plurality of coders less in number than said message waves each arranged to produce code groups of equally spaced pulses of equal duration indicative of the amplitudes of samples applied thereto, means for applying said samples to said coders cyclically and means for timing the operation of said coders to cause the separation of corresponding output pulses from coders to which samples from channels adjacent in the cyclic sampling order are applied, by intervals equal to the duration of said code group pulses multplied by one less than the number of pulses in each code group.

4. In a communication system for transmitting a plurality of independent message waves, means for recurrently sampling the amplitudes of a plurality of waves in turn, a number of coding devices less than the number of said message waves each arranged to produce code groups of $p$ pulses of equal pulse lengths separated by intervals at least equal to the length of said pulses multiplied by the number of pulses, means for applying said samples to said coder cyclically and means for timing the operation of said coders to cause separation of corresponding code groups pulses produced by each code from the pulses produced by the preceding coder in the cycle by an amount equal to the length of said code group pulses multiplied by $(p-1)$.

5. In a communications system for transmitting $m$ message waves, means for successively and recurrently sampling each of $m$ message waves at time intervals L, $n$ coding devices, $n$ being less than $m$, each responsive upon receipt of a message wave sample to produce a code group of $p$ bivalued pulses, following the initiation of a sample by an interval of $$\frac{2L}{m}$$

and separated from each other by intervals greater than $$\frac{L}{m}$$

and less than $$\left(\frac{L}{n}-\frac{L}{m}\right)/P$$

representative of the amplitude of said message wave sample and means for distributing the $m$ message samples among the $n$ coding devices.

6. In a communication system for transmitting $m$ independent message waves, means for successively and recurrently sampling each of a plurality of message waves at time intervals L, $n$ coding devices, where $n<m$, each responsive upon receipt of a message wave sample to produce a code group of $p$ bivalued pulses representative of the amplitude of said message wave sample, said code group following the initiation of said sample by an interval of $$\frac{2L}{m}$$

and comprising a fixed number of pulses separated by intervals greater than $$\frac{L}{m}$$

and less than $$\left(\frac{L}{n}-\frac{L}{m}\right)/P$$

means for distributing the $m$ message samples equally among the $n$ coders and an output circuit common to all of said coders.

7. In a communication system for transmitting $m$ independent message waves, means for successively and recurrently sampling each of a plurality of message waves at time intervals L, $n$ coding devices, where $n<m$, each responsive upon receipt of a message sample to produce a code group of $p$ pulses following initiation of said sample by $$\frac{2L}{m}$$

and being separated from each other by intervals greater than $$\frac{L}{m}$$

and less than $$\left(\frac{L}{n}-\frac{L}{m}\right)/P$$

representative of the amplitude of said message wave sample, said pulses being of length equal to $$\frac{L}{mp}$$

means for distributing the $m$ message samples equally among the $n$ coding devices and an output circuit common to all of said coding devices.

8. In a communication system for transmitting $m$ message waves by time division, $m$ sampling devices arranged successively and recurrently to sample message $m$ waves at time intervals L for periods of duration $$\frac{L}{m}$$

$n$ coding devices, where $n<m$, each responsive to message wave samples to produce code groups of $p$ bivalued pulses, following the termination of said sample by and being separated from each other by an interval greater than $$\frac{L}{m}$$

and less than $$\left(\frac{L}{n}-\frac{L}{m}\right)/P$$

representative of the amplitude of said message wave samples, said pulses being of length $$\frac{L}{mp}$$

means for distributing said $m$ message samples equally among said coding devices and an output common to all of said coding devices.

LARNED A. MEACHAM.

REFERENCES CITED

The following references are of record in the file of this patent:

UNITED STATES PATENTS

| Number | Name | Date |
|---|---|---|
| 2,053,749 | Staneck | Sept. 8, 1936 |
| 2,365,450 | Bliss | Dec. 19, 1944 |
| 2,400,574 | Rea | May 21, 1946 |
| 2,403,561 | Smith | July 9, 1946 |
| 2,408,077 | Labin | Sept. 24, 1946 |
| 2,409,229 | Smith | Oct. 15, 1946 |
| 2,429,631 | Labin | Oct. 28, 1947 |
| 2,435,840 | Morton | Feb. 10, 1948 |
| 2,437,707 | Pierce | Mar. 16, 1948 |
| 2,438,908 | Goodall | Apr. 6, 1948 |
| 2,449,467 | Goodall | Sept. 14, 1948 |
| 2,451,044 | Pierce | Oct 12, 1948 |
| 2,453,454 | Norwine | Nov. 9, 1948 |
| 2,453,461 | Schelleng | Nov. 9, 1948 |
| 2,464,607 | Pierce | Mar. 15, 1949 |
| 2,504,354 | Roschke | Apr. 18, 1950 |
| 2,549,826 | Labin | Apr. 24, 1951 |
| 2,551,024 | Levy | May 1, 1951 |
| 2,559,644 | Landon | July 10, 1951 |

OTHER REFERENCES

"An Experimental Multichannel Pulse Code Modulation System of Toll Quality," Bell System Tech. Journal, Jan. 1948, pages 1–43.

"Pulse Code Modulation," Radio-Craft, Feb. 1948, pages 28–30.

"Pulse-Time-Modulated Multiplex Radio Relay System-Terminal Equipment."

"Electrical Communication," vol. 23, 1946, pages 159–178.